Nov. 3, 1925.  1,560,434

P. M. SPANOGLE

WATER HEATER

Filed July 3, 1923

Inventor

P. M. Spanogle

By William C. Linton,
Attorney

Patented Nov. 3, 1925.

1,560,434

UNITED STATES PATENT OFFICE.

PRUME M. SPANOGLE, OF JACKSON, MICHIGAN.

WATER HEATER.

Application filed July 3, 1923. Serial No. 649,366.

*To all whom it may concern:*

Be it known that I, PRUME M. SPANOGLE, a citizen of the United States of America, residing at Jackson, in the county of Jackson and State of Michigan, have invented certain new and useful Improvements in Water Heaters; and I do hereby declare that the following is a full, clear, concise, and exact description of the invention, such as will enable others skilled in the art to which it appertains to make and use the same.

This invention relates to improvements in water heating devices, having for an object to provide an automatic fuel control and heating device, especially adapted for use in connection with stand boilers, whereby water in the equipped boiler will be heated to a desirable predetermined temperature, whereupon the supply of fuel to the heater burner will be discontinued and likewise, the vent or flue opening of the boiler closed in order that the boiler containing the heated water will be insulated from the atmosphere and in consequence, will be permitted to preserve the temperature of its contents for a considerable period of time.

Among other aims and objects of the invention may be recited, the provision of a water heater of the character mentioned which will function to supply the desired quantity of hot water with but a minimum amount of attention thereto; to effect such heating of the water at an economical operating cost, and by reason of its compact construction, render the same particularly advantageous for use in confined or limited spaces.

Other objects will be in part obvious and in part pointed out hereinafter.

In order that the invention and its mode of operation may be readily understood by persons skilled in the art, I have in the accompanying illustrative drawings, and in the detailed following description based thereon, set out several possible embodiments of the same.

Figure 1:
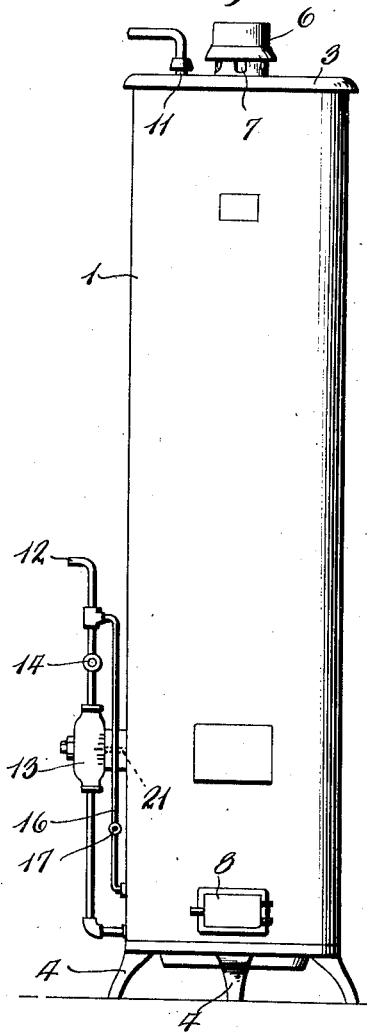
Figure 1 is a side elevation of the improved water heater.

Having more particular reference to the drawings, in connection with which like characters of reference will designate corresponding parts throughout, the improved water heater may be stated to comprise a substantially cylindrical but hollow double-walled housing 1, having a suitable sheathing or layers of asbestos or other heat insulating material 2 interposed between the walls thereof, while the upper portion of said housing is closed by a heat insulated double-walled top 3, whereas the bottom of the housing is open and is supported upon equi-spaced legs 4 and snugly receives and supports in said open lower portion, a circular drip pan 5, the purpose of which will be hereinafter described.

A flue pipe 6 is engaged in the concentric portion of the top 3 and is provided with usual draft openings 7 for an obvious purpose.

In the lower portion of the housing 1, there is formed an opening adapted to be normally closed by means of a horizontally swinging door 8, whereby access may be had to the burner arranged within the bottom portion of the housing, when it becomes necessary.

Figure 2:
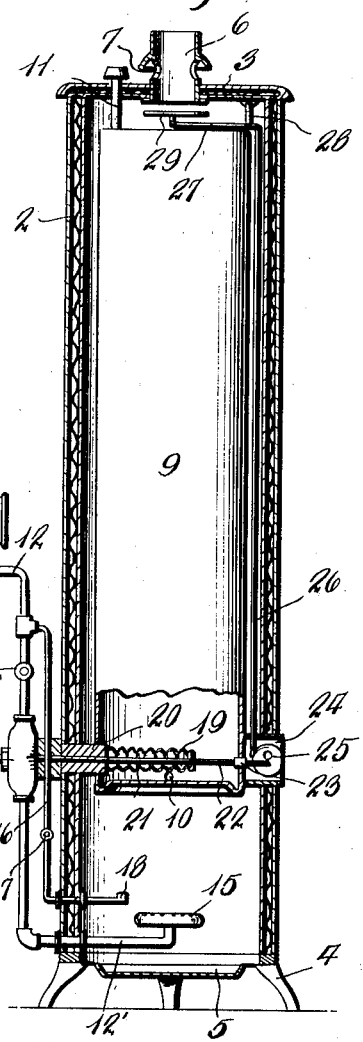
Figure 2 is a vertical section therethrough.

Supported within the hollow cylindrical housing 1, is a cylindrical boiler 9 having a cold water inlet connection 10 and a hot water outlet connection 11 communicating with its lower and upper extremities, respectively, the hot water outlet connection, as shown in Figure 2, extending through the top or cover 3 and being provided with a suitable nipple or the like, whereby connection may be effected between the same and the usual hot water conveying pipes.

With a view towards providing means for heating the water contained by the boiler 9, that is, as supplied thereto from the cold water inlet connection 10, a gas supply pipe 12 is extended into proximity to the housing 1 and has an automatically operable valve 13 and a manually operable valve 14 interposed therein, such pipe extending downwardly and having a right angularly disposed elbow 12' thereon, which extends thru the lower portion of the housing 1 into the same and carries thereon a gas burner 15. A branch pipe 16 is tapped into the upper portion of the gas supply pipe 12 and is provided with a suitable valve 17; such branch pipe being formed with a right angular extension which is passed through a portion of the housing 1 in proximity to the elbow 12' and carries a pilot burner 18 upon its inner end, which, as will be understood, is arranged adjacent to the burner 15.

Arranged and supported within the lower portion of the boiler 9 and disposed diametrically thereof is an expansible thermostatic element 19, secured at one end to a block or guide bracket 20 passing through the lower portion of said boiler 9 and the adjacent portion of the housing 1. A non-expansible rod 21 is arranged within this thermostatic element 19 and is slidably received through the guide bracket 20 extending into engagement with the valve proper of the automatic gas regulating valve 13 hereinbefore referred to. Another non-expansible rod, or an extension of the rod 21, indicated for the purpose of convenience herein by the numeral 22 is extended from the outer end of the expansible thermostatic element 19 through a suitably packed opening in the lower portion of the boiler 9, as indicated at 23 into a circular compartment 24. In this circular compartment, there is rotatably mounted, an eccentric 25 with which the adjacent end of the rod 22 is connected. A vertically disposed connecting rod 26 is also connected at its lower end to the eccentric 25 and as will be noted upon reference to Figure 2, extends upwardly between the inner side of the housing 1 and the adjacent outer side of the boiler 9 to a point in proximity to the upper end of said boiler 9, whereat, it is connected to the adjacent end of an arm 27 pivotally mounted upon a bracket 28 securely supported upon the adjacent portion of the under side of said top 3. A circular plate valve 29 is carried upon the remaining extremity of the pivotally mounted arm 27 and is adapted to be engaged over the open lower end of the flue 6, at times. In this connection, it is of course to be understood that the flue 6 is connected with the usual outside flue, whereby the exhaust gases from the heater may be discharged into the atmosphere.

The operation of my water heater may be reviewed as follows:

The boiler 9 is first filled with cold water by way of the inlet connection 10, whereupon the valve 17 in the branch pipe 16 is opened and the flow of gas from the pilot burner 18 is ignited, access being had to such burner by way of the door 8. At this time, the manual valve 14 in the main gas supply line 12 is opened and with flow of the gas from the burner 15, it will be immediately ignited from the pilot light at the burner 18. Thus, the heated air resulting in the housing 1, the major portion of which will be directly below the boiler 9, will serve to bring the temperature of the cold water within said boiler to the desired degree of heat. When this desired degree of heat has been reached, the water will act upon the expansible thermostatic element 19 to expand it, thus causing the non-expansible rod 21 to be moved laterally, in order that the automatic valve 13 will be moved to its closed position for discontinuing the flow of gas through the main gas supply pipe 12 to the burner 15. Simultaneously, with this interruption of the supply of gas to the burner 15, a thrust will be imparted to the rod 22 which is connected to the eccentric 25, thus rotating said eccentric and causing a downward pull to be imparted to the vertically disposed connecting rod 26 which is pivotally connected at its upper end to one end of a pivotally mounted arm 27 carrying the flue regulating valve 29. Thus, the flue regulating valve 29 will be moved towards or over the open lower end of the flue 6 and when in this position, the boiler 9 containing the hot water will be sealed or insulated with respect to the atmosphere. Hence, the heated contents of the boiler will be preserved at their heated temperature or approximately heated temperature for a considerable period of time. As the hot water is needed, it of course is drawn from the boiler 9 by way of the hot water outlet connection 11 into the conduits connected thereto.

Figure 3:
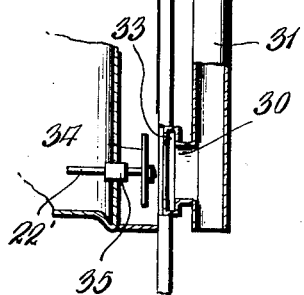
Figure 3 is a fragmentary enlarged detail, partly in section, of a slightly modified form of flue regulating valve.

In the Figure 3, I have shown a slightly modified form of flue, the same herein being of the revertible type, wherein an opening is formed in the lower portion of the housing 1 and receives therein the lateral circular branch 30 of a flue 31 which is arranged in proximity to the outer side of the housing 1 and extends vertically thereof for a distance whereupon it is formed with an elbow 32 in order that suitable connection with an outside flue may be made. The lower end of the flue 31, as will be noted, is open whereby to create a draft therethrough and by the branch 30. This branch 30 is provided with a circular valve seat or collar 33 which is adapted to receive thereon, at times, a plate valve 34 carried upon the outer end of the rod 22', which has connection at its remaining end with the outer end of a thermostatic element such as indicated by the numeral 19 in Figure 2; the rod 22', of course, passing through a suitable stuffing gland 35, whereby to provide a fluid tight jointure. Thus, with expansion of the thermostatic member 19, the valve 34 will be moved onto the seat 33 of the branch 30 of the flue 31 and in consequence, the exhaustion of the hot gases from the housing to the flue will be prevented and therefore, the interior temperature of said housing will be preserved for a material length of time in order that the temperature of the water within the boiler 9 may be likewise preserved.

Manifestly the construction shown is capable of considerable modification and such modification as is within the scope of my claims, I consider within the spirit of my invention.

I claim:

1. The combination with a water heater comprising a heat insulated housing, a boiler suspended therein and spaced from the bottom thereof to form a combustion chamber, a burner in said chamber, an automatic valve for controlling the supply of gas to said burner, a flue communicating with said housing, a plate valve engageable over said flue, at times, an expansible thermostatic element arranged within said boiler, a non-expansible rod connected to one end of said thermostatic element, a cam mounted in the housing and connected to the remaining end of said non-expansible rod, and another non-expansible rod disposed longitudinally of the housing, connected at one end to said cam and at its other end to said plate valve.

2. A water heater comprising a double-walled heat insulated housing, a boiler supported within said housing having the bottom thereof spaced from the bottom of said housing, a flue communicating with the upper end of said housing, an arm pivotally supported upon the inner side of the top of said housing, a plate valve connected to the inner end of said arm and engageable over said flue, at times, a compartment formed in the lower portion of the housing adjacent to the lower end of said boiler, an eccentric rotatably mounted in said compartment, a vertically disposed connecting rod engaged at its lower end with said eccentric and pivotally engaged at its upper end with the remaining end of said pivotally mounted arm, a gas burner supported within the lower portion of said housing, an automatic valve for controlling the supply of gas to said burner, and a common thermostatic means received in the lower portion of said boiler having connection with said eccentric and automatic gas control valve, as and for the purpose set forth.

3. A water heater comprising a double-walled heat insulated housing, a boiler supported within said housing having the bottom thereof spaced from the bottom of said housing, a flue communicating with the top of said housing, an arm pivotally supported upon the inner side of the top of the housing, a plate valve pivotally mounted upon one end of said arm and engageable over the said flue, a compartment formed in the lower portion of said housing adjacent the lower end of said boiler, an eccentric rotatably mounted in said compartment, a vertically disposed connecting rod engaged at its lower end with said eccentric and at its upper end with the remaining end of said pivotally mounted arm, a gas supply conduit extending into proximity to said housing and through the lower portion thereof, a burner mounted upon the inner end of said conduit within the lower portion of said housing, a manually operable valve interposed in said gas supply conduit, an automatically operable valve interposed in said gas supply conduit, an expansible thermostatic element within the lower portion of the boiler, a rod connected to and arranged within said thermostatic element and connected to the automatic valve, and a second rod connected to one end of said thermostatic member and pivotally connected to the eccentric, as and for the purpose set forth.

In witness whereof I have hereunto set my hand.

PRUME M. SPANOGLE.